Sheet 1, 2 Sheets.

W. B. Bement.

Supporting Structure for Milling Machine.

No. 1,370. Reissued Jan. 6, 1863.

Witnesses;
Jno. P. Green
C. A. Perrow

Inventor;
Wm. B. Bement

THE GRAPHIC CO. PHOTO.-LITH. 39 & 41 PARK PLACE, N.Y.

Sheet 2, 2 Sheets.

W. B. Bement.

Supporting Structure for Milling Machine.

No. 1,370. Reissued Jan. 6, 1863.

Witnesses.
E. W. Stott
C. A. Johnson

Inventor:
Wm. B. Bement

THE GRAPHIC CO. PHOTO-LITH. 39 & 41 PARK PLACE, N.Y.

UNITED STATES PATENT OFFICE.

WILLIAM B. BEMENT, OF PHILADELPHIA, PENNSYLVANIA.

IMPROVEMENT IN STANDS FOR MACHINES.

Specification forming part of Letters Patent No. 35,433, dated June 3, 1862; Reissue No. 1,370, dated June 6, 1863.

*To all whom it may concern:*

Be it known that I, W. B. BEMENT, of Philadelphia, Pennsylvania, did obtain Letters Patent of the United States, bearing date the 3d day of June, 1862, for an Improvement in Stands for Machines, which Letters Patent I now deem inoperative and invalid by reason of a defective and insufficient specification; and I do hereby declare the following to be a full, clear, and exact description of my said invention, reference being had to the accompanying drawings, and to the letters of reference marked thereon.

My invention consists in constructing the stands, frames, or main supporting structures so that closets or tool receptacles shall be formed therein by casting the said stands, frames, or supporting structures hollow and in one piece, substantially as described hereinafter.

Although many minor advantages result in the use of my invention, my main object has been to utilize the space necessarily occupied by the stands or frames of machines by availing myself of this space to form chests or closets for the reception of tools and other appliances used in connection with whatever machine may be secured to or form a part of the stand or frame, and this without detracting from, but actually adding to, the strength, stability, compactness, and symmetry of the said stands or frames.

In order to enable others skilled in the construction of machinery to make my invention I will now proceed to describe the manner of constructing and applying the same.

Figure 2:
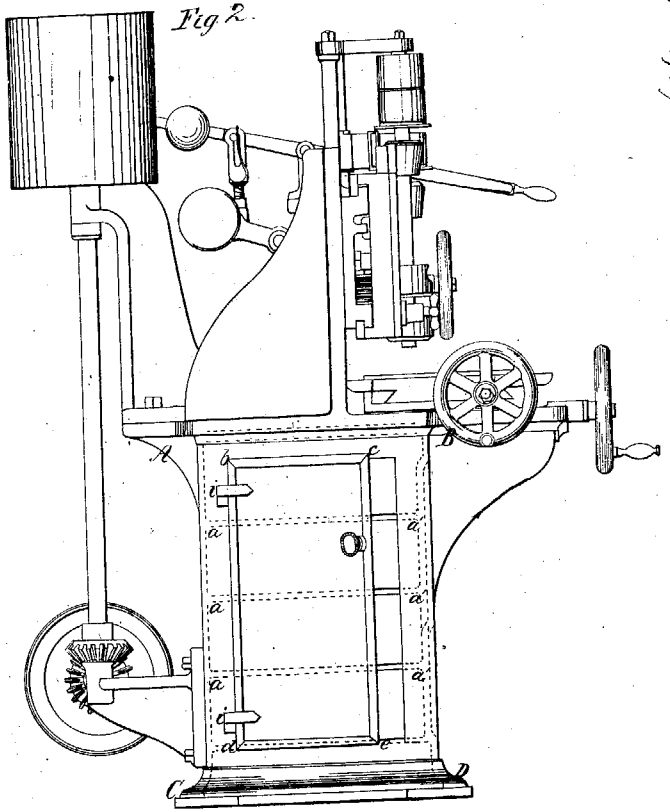
Figure 1:
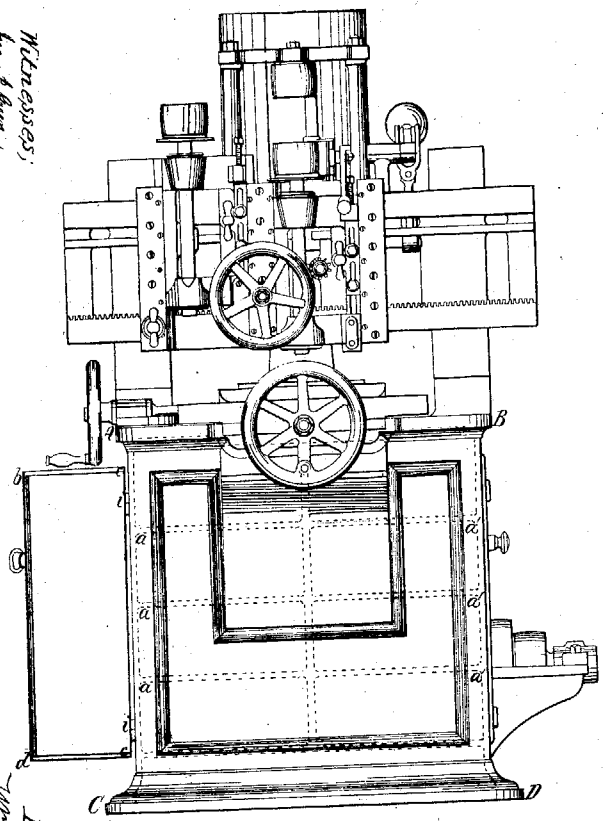
Figure 4:
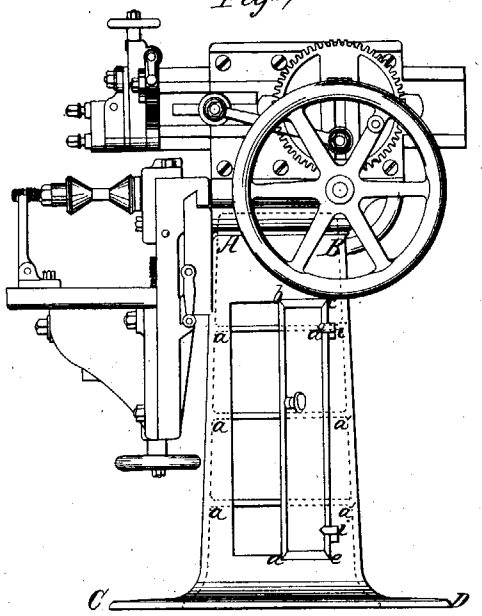
Figure 3:
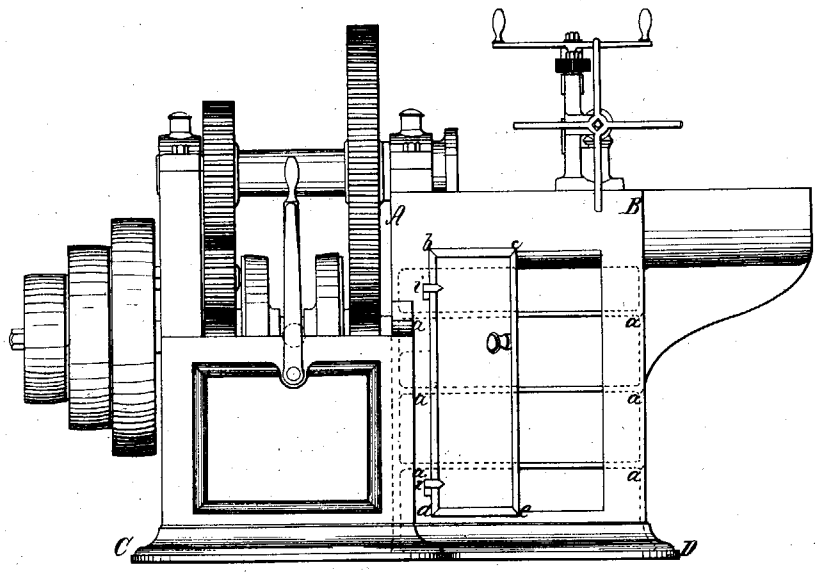

On reference to the accompanying drawings, which form a part of this specification, Figure 1, Drawing No. 1, represents a front view, and Fig. 2 a side view, of a milling-machine. In Drawing No. 2, Fig. 3 represents a side view of a bolt-threading machine, and Fig. 4 a side view of a shaping-machine, all these machines having frames, stands, or main suporting structures made according to my improvements.

Prior to my invention it had been the practice to construct the frames or stands of machines with the view only of affording a proper support for the superstructure, and for the brackets, bearings, or other appliances required for the moving parts of the machine. In some instances cast-iron stands of the most simple character have been adopted; in other instances elaborate and straggling frames, with prominent ribs and flanges, made with a view to the attainment of proper stability, and ornamented according to the taste of the constructor, have been used; in other instances hollow columns have been adopted, but in all cases without regard to any utilizing of the space occupied by the stands.

The frames or stands of the machines shown in the drawings are marked by the letters A, B, C, and D, and consist of simple boxes or chests cast in one piece, and of a form best adapted to receive the permanent and moving appliances which constitute the machine proper. The interior of the chest or closet may be separated into as many compartments as its extent and the experience of the constructor may consider most appropriate by partitions, *a a a*, forming shelves for the reception of tools, &c. One side, or a portion of one side, of the closet is open, and this side may, if deemed desirable, be furnished with a door, E, hung to one edge of the opening by suitable hinges, *i i*, and provided with an appropriate handle, *e*, and by any suitable locking device.

The side of the stand selected for the opening should be that where the least rigidity is required.

The manner of casting the closet in one piece will be too thoroughly understood by those familiar with the art of molding and with the construction of machinery to need description here.

In all machines, such as those illustrated in the drawings—and to these I may add drilling-machines, plowing-machines, slotting-machines, boring-machines, and lathes—in fact in most, if not all, machines used for the cutting and shaping of metals and other materials, there are necessarily many detachable parts and a variety of tools, which must be ready for use when required, and which it is desirable to have in safe keeping in a position near to the machine in connection with which they have to be used. The closet above described as being embodied in and in fact constituting the frame or stand of the machine forms a most appropriate receptacle for these tools and appliances, inasmuch as the closet is easy of access to the operative who attends the machine; and who can readily remove and replace the tools, &c., without the necessity of leaving and having his attention distracted from the machine.

That tools and detachable portions of machines should be at hand the moment they are required, that the operator's time should not be occupied in searching for these tools, are matters of importance too well understood by those familiar with the management of machine-shops to need lengthy explanation.

In thus utilizing the space necessarily demanded by the stands or frames of machines it will be understood that the closets, shelves, chests, or benches which have been heretofore separate from the machine, and in or on which the tools are usually, and in many instances carelessly, deposited, may be dispensed with, and consequently the space demanded by these closets, &c., may be devoted to other purposes, at the same time the convenient and handy receptacle presented by the adoption of my invention affords an inducement for the operator on the machine to dispose of and arrange his tools in a proper and orderly manner.

It will be at once perceived on reference to the accompanying drawings that while the above important advantages are attained by my invention, they in no way detract either from the stability or symmetry of the stands or frames; on the contrary, the frames are more solid and stable than those of ordinary construction, and afford ample opportunity for such ornamentation as the taste of the constructor may suggest as the most appropriate.

When my closet stands or frames are compared with the many intricate and straggling structures heretofore used as supports for machines, it will be evident that simplicity and compactness are attained by my invention.

Without confining myself to any particular external form or internal arrangement of the closet, both of which must of necessity be determined by the character of the machine secured to or forming a part of the closet, I claim as my invention and desire to secure by Letters Patent—

Constructing the stands, frames, or main supporting structures of machines so that closets or tool-receptacles shall be formed therein by casting the said stands, frames, or supporting structures hollow and in one piece, essentially in the manner described.

In testimony whereof I have signed my name to this specification before two subscribing witnesses.

WM. B. BEMENT.

Witnesses:
HENRY HOWSON,
CHAS. E. PANCOAST.